(12) United States Patent
Patti et al.

(10) Patent No.: US 8,582,654 B1
(45) Date of Patent: Nov. 12, 2013

(54) GENERATING A DEBLOCKED VERSION OF VIDEO FRAMES USING MOTION ESTIMATION

(75) Inventors: Andrew J. Patti, Cupertino, CA (US); Vikas Ramachandra, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 948 days.

(21) Appl. No.: 12/570,354

(22) Filed: Sep. 30, 2009

(51) Int. Cl.
*H04N 7/12* (2006.01)

(52) U.S. Cl.
USPC .................................. 375/240.16; 375/240.12

(58) Field of Classification Search
USPC ............. 375/240.12, 240.16, 240.24, 240.26, 375/240.27, 240.01, 240.03, 245
See application file for complete search history.

(56) References Cited

U.S. PATENT DOCUMENTS

| | | | |
|---|---|---|---|
| 2005/0063473 A1* | 3/2005 | Koyama et al. | 375/240.27 |
| 2005/0226325 A1* | 10/2005 | Dei et al. | 375/240.12 |
| 2006/0026578 A1* | 2/2006 | Ramchandran et al. | 717/149 |
| 2006/0126734 A1* | 6/2006 | Wiegand et al. | 375/240.12 |
| 2007/0147500 A1* | 6/2007 | Chono | 375/240.12 |
| 2007/0177667 A1* | 8/2007 | Subramania et al. | 375/240.12 |
| 2009/0185078 A1* | 7/2009 | Van Beek et al. | 348/624 |

\* cited by examiner

*Primary Examiner* — Hassan Phillips
*Assistant Examiner* — Ajay Cattungal

(57) ABSTRACT

Compressed frames of a video with associated reduced information about an object are received. The video has unreduced information about an object moving with respect to boundaries that are fixed with in each frame of the video and the compressed frames have reduced information about the object moving with respect to the boundaries that are fixed with in each of the compressed frames. The reduced information has quantization error due to compression. An estimate of the unreduced information is created by transforming the reduced information into the estimate using computer implemented motion estimation. The estimate has less quantization error than the reduced information.

14 Claims, 7 Drawing Sheets

FIGURE 2B

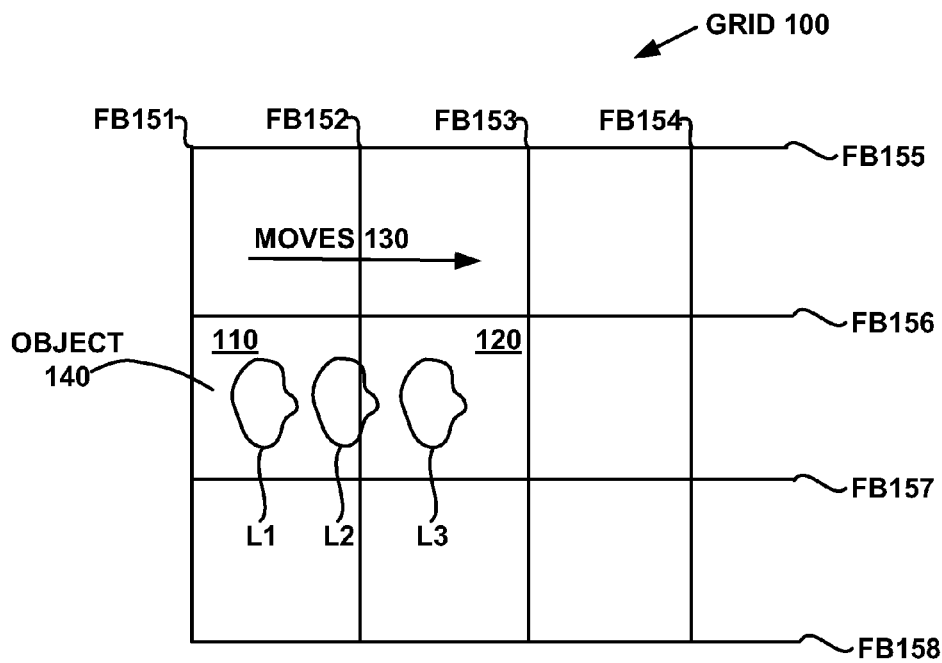
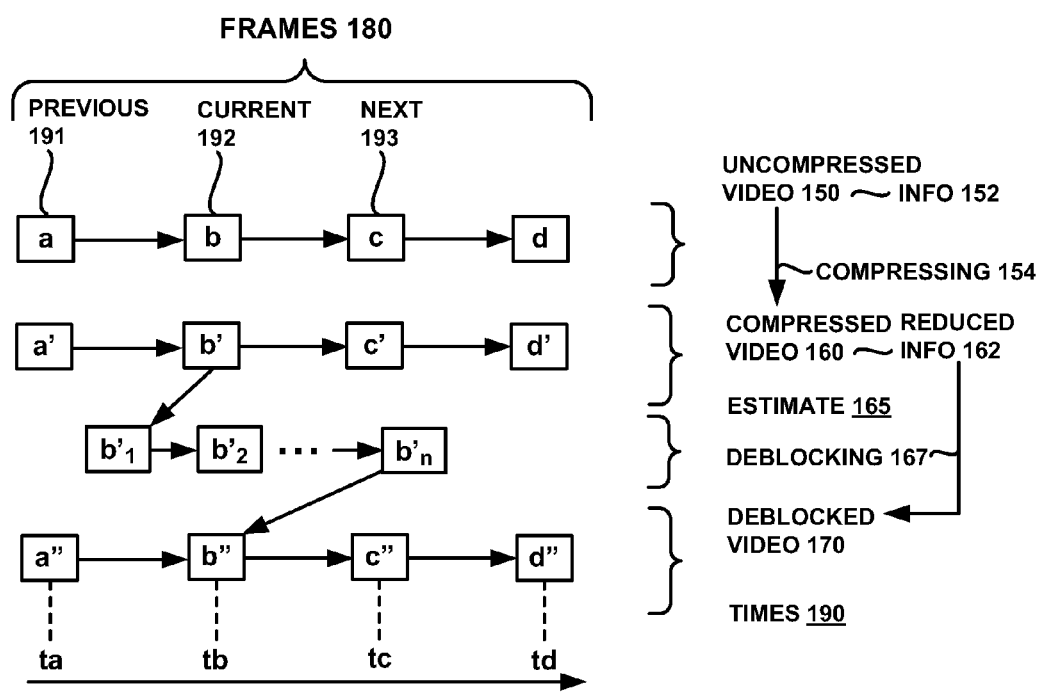
FIG. 1

$$g(m, n, t_y) = \sum_{p, q} f(p, q, t_x) \, h(p, q, m, n; t_x, t_y) \quad \text{Equation 1a}$$

$$f(p, q, t_x) \text{ is } X\text{''} \quad \text{Equation 1b}$$
$$f(p, q, t_x) \text{ can be } X \text{ or can approximate } X$$

$$G = \sum f \cdot h_{DCT} \quad \text{Equation 1c}$$

$$d(m, n, t_y) = g(m, n, t_y) - \hat{g}(m, n, t_y) \quad \text{Equation 2}$$

$$D(k, l, t_y) = G(k, l, t_y) - \hat{G}(k, l, t_y) \quad \text{Equation 3}$$

$$D(k, l, t_y) = \sum_{p, q} f(p, q, t_x) \, h_{DCT}(p, q, k, l; t_x, t_y) - \hat{G}(k, l, t_y) \quad \text{Equation 4}$$

$$P(k, l, t_y)(f^0) = \begin{cases} f^0 + \dfrac{(b_l + \hat{G}(k, l, t_y) - f^0 \cdot h_{DCT}(k, l)) h_{DCT}(k, l)}{\| h_{DCT}(k, l) \|_2} ; & f^0 \cdot h_{DCT}(k, l) < b_l + \hat{G}(k, l, t_y) \\ f^0 + \dfrac{(b_u + \hat{G}(k, l, t_y) - f^0 \cdot h_{DCT}(k, l)) h_{DCT}(k, l)}{\| h_{DCT}(k, l) \|_2} ; & f^0 \cdot h_{DCT}(k, l) > b_u + \hat{G}(k, l, t_y) \\ f^0 ; & \text{elsewhere} \end{cases} \quad \text{Equation 5}$$

FIG. 3

GENERATING A DEBLOCKED VERSION OF VIDEO FRAMES USING MOTION ESTIMATION

BACKGROUND

With the spread of broadband Internet access, there is an increased desire to access video clips that are available on the Internet. Since a large percentage of the videos are made by individuals and amateurs, the technical quality is generally poor. Most videos have low resolution and are noisy, especially those which have been captured using cheap cameras built into mobile phones. Also, for the sake of faster uploads as well as efficient use of storage, the video host sites on the Internet that provide the videos also process the videos, which further decreases the quality of the videos.

At the other end of the video industry, there has been a steady increase in consumer demand for high resolution displays. It is natural for users to try and watch videos obtained from the Internet on their high resolution displays. However, the low quality videos are accentuated when viewed on high resolution displays.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below:

FIG. 1 is a block diagram depicting an object moving with respect to a grid of blocks with fixed boundaries and a series of video frames that were taken of the object as the object moves with respect to the fixed boundaries, according to one embodiment.

FIG. 3 depicts various equations that can be used as a part of generating a deblocked version of frames, according to various embodiments.

Figure 2A:
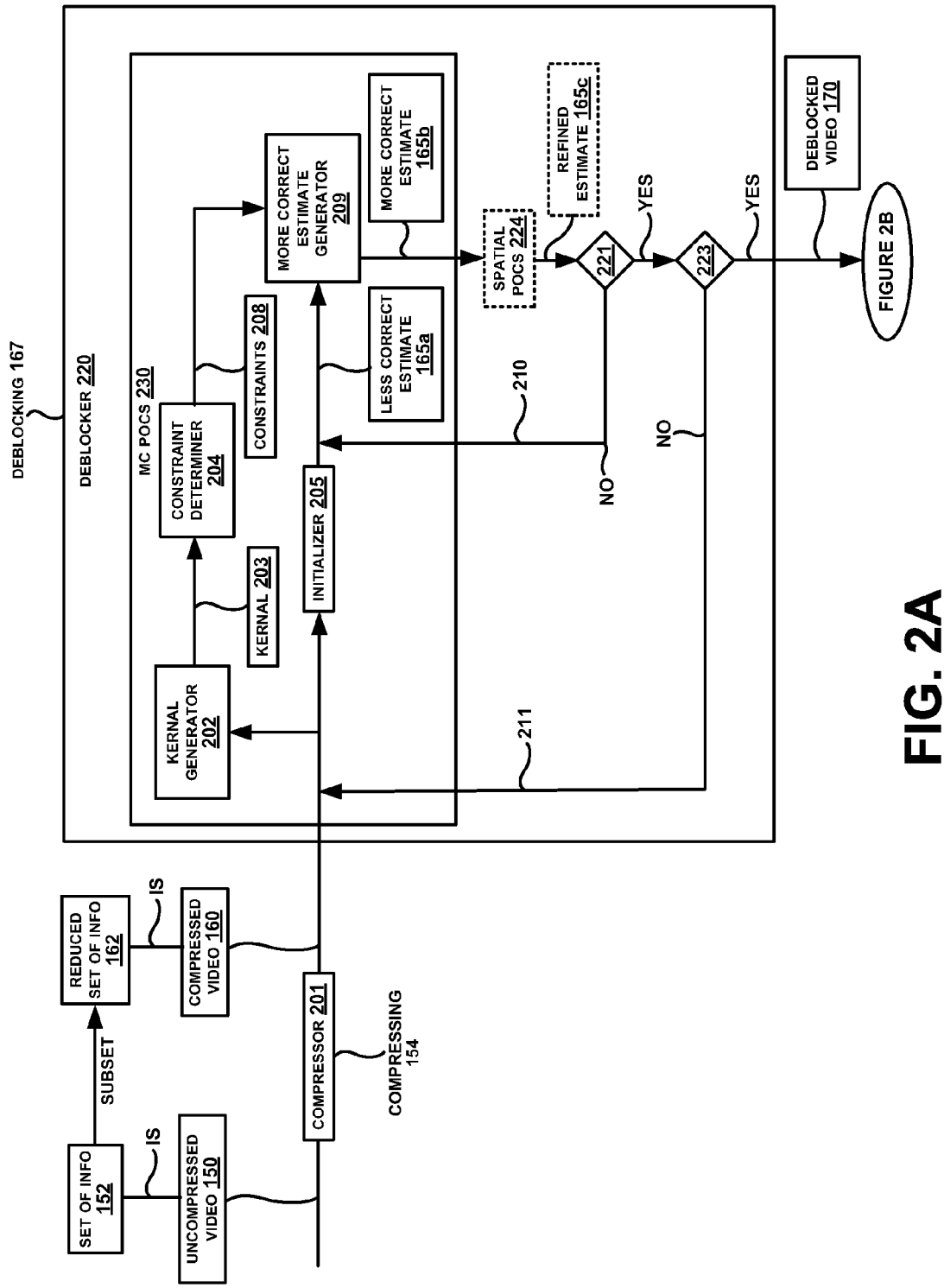
FIG. 2A is a data flow diagram of deblocking, according to various embodiments.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the present Description of Embodiments, discussions utilizing terms such as "receiving," "transforming," "associating," "generating," "detecting," "compensating," "compressing," "encoding," "deblocking," "decoding," "forming," "upscaling," "down scaling," "quantizing," "increasing quantization," "classifying," "training," "computing," "relating," "estimating," "projecting," "correcting," "obtaining", "accessing," "determining," "using," "communicating," "selecting," "receiving," "using," "transforming," or "using data to transform the state of a device," the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

According to one embodiment, higher resolution uncompressed videos, which can be displayed on high resolution displays, are created, for example, low resolution videos, such as compressed videos. Examples of compressed videos include, among other things, compressed versions of higher uncompressed resolution videos as well as videos that were captured using cheap cameras or videos with low resolution that have, for example, been downloaded from an Internet web site. A video is compressed reducing the information associated with the video using what is known as "quantization." Since information has been thrown away, quantization error can result when a compressed video is deblocked. Estimates of the uncompressed video are created from the compressed video, according to one embodiment. For example, motion estimation can be used, when the compressed video is deblocked, to correlate information about a moving object associated with different frames of a video. The correlated information can be used to reduce quantization error by creating estimates of the uncompressed video. According to one embodiment, an estimate is used as a deblocked video that corresponds to the uncompressed video that it was generated from.

According to one embodiment, an estimate is upscaled to create a video that has high resolution. According to one embodiment, the upscaled video has as high or higher resolution than the original uncompressed video. For example, according to one embodiment, filters/classifiers are generated via training that utilizes the various deblocking embodiments described herein. A classification upscaler utilizes the generated filters/classifiers. The deblocked video, which was deblocked according to various embodiments, is upscaled using the trained classification upscaler, according to various embodiments. The generated upscaled video, according to one embodiment, has higher resolution than the corresponding uncompressed video that it was generated from.

More specifically, FIG. 1 depicts frames 180 associated with various versions of a video, according to one embodiment. The frames 180 include frames associated with uncompressed video 150, a compressed video 160, an estimate 165 of the uncompressed video 150, and a deblocked video 170. Frames a-d form the uncompressed video 150. The uncompressed frames a-d are compressed resulting in frames a'-d', which are associated with the compressed video 160. Frames $b'_1$-$b'_n$ are estimates of the uncompressed frame b, as will become more evident. Frames a"-d" form the deblocked video 170 of compressed frames a'-b'. The times 190 indicate the times associated with the various frames for the videos 150, 160, 170 and the estimate 165. For example, frames a, a', a" are at time $t_a$, Frames b, b', b", and $b'_1$-$b'_n$ are at time $t_b$. Frames c, c', and c" are at time $t_c$ and frames d, d', and d" are at time $t_d$.

FIG. 1 also depicts an object 140 moving with respect to a grid of blocks 100 with fixed boundaries 151-158 and a series of frames 180 that were taken of the object 140 as the object 140 moves 130 over time 190 with respect to the fixed boundaries 151-158, according to one embodiment. For example, boundaries 151-154 are vertical boundaries and boundaries 155-158 are horizontal boundaries. Frames a, a', a" are of the object 140 at location L1 at time $t_a$, frames b, b', b" are of the object 140 at location L2 at time $t_b$, frames c, c', and c" are of the object 140 at location L3 at time $t_c$ and so on with frames d, d', d" at time $t_d$. A grid of blocks 100 is associated with each of the frames 180 and the object 140 moves 130 relative to the fixed boundaries 151-158 that form the grid 100 of blocks for each frame 180. At location L1, the object 140 is entirely inside of block 110. At location L2, the object 140 is partially inside of block 110 and partially inside of block 120. At location L3, the object has moved entirely into block 120.

An estimate 165 is used to create a frame a"-d" of the deblocked video 170. For example, frame $b'_1$ is a first estimate of the uncompressed frame b and is initialized to the compressed frame b'. Frame $b'_2$ is a second estimate of the uncompressed frame b. Previous estimates are used to create subsequent estimates in an iterative estimate correction loop, as will become more evident. For example, $b'_1$ is used to create $b'_2$ which is used to create $b'_3$ and so on to $b'_n$ until a condition is met. Subsequent estimates have less quantization error than previous estimates. For example, the second estimate $b'_2$ has less quantization error than the first estimate $b'_1$, the third estimate $b'_3$ has less quantization error than the second estimate $b'_2$ and so on to $b'_n$. When the condition is met, deblocked frame b" is initialized with the estimate frame $b'_n$, as depicted in FIG. 1. The frames $b'_1$-$b'_n$ will be discussed in more detail in the context of FIG. 2A, among other things.

For the sake of simplicity, FIG. 1 only depicts a video with four frames a, b, c, and d. However, various embodiments are well suited for any videos with two or more frames. For the sake of simplicity, FIG. 1 only depicts estimates 165 for frame b. However, various embodiments are well suited for generating estimates of any uncompressed frame a-d associated with a video 150. For example, estimates $a'_1$-$a'_n$ of frame a can be generated, estimates $c'_1$-$c'_n$ of frame c can be generated, and estimates $d'_1$-$d'_n$ of frame d can be generated.

Referring to FIG. 1, typically a large amount of data is associated with uncompressed video data 150. Therefore, a large amount of storage space is used to store a video 150. Similarly, transmitting video data 150 over a network uses a large bandwidth. Video 150 is compressed 154 in order to use less memory to store the video 160 or to use less bandwidth while transmitting the compressed video 160, among other things.

Compressing 154 a video 150 may involve analyzing the video 150 for patterns to determine what portions of the video 150 can be removed while preserving characteristics of the video 150. For example, the video 150 may be analyzed to determine what portions of it are similar and, therefore, can be reduced. In one example, referring to FIG. 1, an object 140 may have a very similar appearance in several different frames. Instead of retaining the same amount of data that would be used for representing that object 140 for every single compressed frame a'-d', the amount of data pertaining to that object 140 can be reduced for subsequent frames. Motion estimation can be used for determining where the objects 140 are in the uncompressed frames 150, by computing motion predicted frames during encoding, in order to reduce the data associated with the compressed frames 160 pertaining to the objects 140.

In another example, human factors studies have also been used to identify portions of video 150 that can be removed without negatively impacting a person's experience viewing the video. For example, human factors studies have shown that people notice certain types of changes more readily than other types of changes. Therefore, more data can be removed from features depicted in the video 150 that people focus less on. Compression algorithms have been designed to take the results of these human factors studies into account when determining what portions of the video 150 to remove. Using conventional methods, removed information is quite visible when a compressed video is upscaled for viewing on high resolution displays. Compression 154 is also referred to as encoding and the result is referred to as compressed video 160, encoded video, or a codec.

A video 150 is compressed 154 by quantizing it. For example, the values associated with an uncompressed video 150 may be categorized according to ranges, also known as "bins." For example, assume that an uncompressed video 150 has values that range from 0 to 10, where the uncompressed video 150 has 5 values of 0 and 6 values of 1, and the compression 154 may quantize those values into the bins [0,1], [1,2], . . . [9,10]. When the 5 values of 0 and the 6 values of 1 are quantized into the bin [0,1], a deblocking process 167 will know that there are 11 values in the range of 0-1 but will not know how many 0s and how many 1s were associated with the uncompressed video 150, which results in what is known as "quantization error." Therefore, the more a video is compressed, the more it is quantized, and the higher the quantization error will be. As will become more evident, with block-based deblockers, the "quantization error" tends to be perceived as "blocking artifact" where the blocking boundaries appear to flicker. The "flickering" is also commonly referred to as "mosquito noise."

When the uncompressed video 150 is compressed 154, the amount of information 152 associated with the video 150 is reduced resulting in reduced information 162. For example, different subsets of the original unreduced set of information 152 are discarded depending on where the object 140 is located with respect to the fixed boundaries 151-158, as described herein.

Returning to the example of an uncompressed video 150 having values 1-256. Compressing 154 the video 150 results in the compressed video 160 having a reduced set of information 162 with a first subset of information including values 18, 20, 30, 42, 50 and a second subset of information including values 20, 30, 35, 46. The two subsets are examples of results from quantizing the uncompressed video 150.

Referring to FIG. 1, an uncompressed video 150, 170 is made up of pixels. Compression algorithms can more easily analyze video data in what is known as the transform domain instead of in the pixel domain. For example, the uncompressed video 150 is transformed using Fourier type transforms and the compression algorithms analyze the transformed video to determine what data can be removed. For example, the uncompressed video data 150 is analogous to a continuous stream of data that is not quantized. The process of transforming the video data using Fourier type transforms and compressing the video data quantizes the video data.

According to one embodiment, compression 154 is performed using transform domain coded video format, such as MJPEG, MPEG 1, MPEG 2, MPEG 4, H.263 or H.264. According to one embodiment, the blocks associated with the grid 100 are 8×8 pixel blocks 110, 120 (FIG. 1) associated with transform domain coded video formats. The blocks 110, 120 (FIG. 1) associated with the grid 100 (FIG. 1) may have other dimensions besides 8×8 pixels.

Studies, which gave rise to various embodiments, have shown that certain types of deblocking are better at removing compression artifacts than others. For example, certain types of deblocking operate on a single frame at a time (referred to herein as "single frame deblocking"). However, these studies have shown that single frame deblocking causes additional blurring of the video frames. Therefore, according to one embodiment, motion estimation is used during deblocking 167 to properly detect and account for shifting quantization boundaries that result from an object 140 (FIG. 1) moving 130 with respect to fixed boundaries 151-158 (FIG. 1) in different frames 180 (FIG. 1).

For example, referring to FIG. 1, motion estimation can be used to analyze the locations L1-L3 of the object 140 with respect to the fixed boundaries 151-158 associated with the compressed frames 160. The locations L1-L3 of the objects 140 can be used to correlate subsets of reduced information 162 about the objects 140 with each other. For example, there is one subset of information associated with an object 140 when the object 140 is located at L1 and another subset of information associated with the object 140 when the object 140 is located at L2 and so on. The locations L1-L2 of the object 140 can be used to determine that certain subsets of reduced information 162 are associated with the same object 140 and, therefore, are associated with each other. Since the subsets of information are associated with each other, the subsets of information can be combined in order to obtain more information about the object 140 than what is provided by only one of the subsets of information associated with one of the frames 180. Returning to the simplified example for the purpose of illustration, motion estimation can be used to determine that the first subset of information—18, 20, 30, 42, 50—is related to the second subset of information—20, 30, 35, 46—so that the combination of the two subsets—18, 20, 30, 35, 42, 46, 50—can be used to decrease quantization error.

The motion estimation can be used to correlate information between two or more compressed frames, according to one embodiment. For example, referring to FIG. 1, motion estimation can be used to correlate information about the object 140 between a compressed frame a' when the object 140 is in block 110 at time $t_o$ with compressed frame b' when the object 140 is partially in block 110 and partially in block 120 at time $t_b$. Motion estimation can be used to correlate information about the object 140 between either compressed frame a' or c' and an adjacent uncompressed frame b. Motion estimation can be used to correlate information about the object 140 between a compressed frame a' or c' and an estimate $b'_1$-$b'_n$ of an adjacent uncompressed frame b. Motion estimation can be used to correlate information about the object 140 between either compressed frame a' or c' and an adjacent deblocked frame b".

According to one embodiment, the motion estimation that is used to correlate information about the object 140 for the purpose of decreasing quantization error is computer implemented. According to one embodiment, the motion estimation that is used to correlate information about the object 140 for the purpose of reducing quantization error while deblocking 167 is not the same as the motion estimation that is performed while compressing 154, as will become more evident. According to various embodiments, motion estimation is performed using compressed video 160, among other things, as will become more evident.

Referring to FIG. 1, compression 154 quantizes a video 150 and introduces quantization error. A compressed video 160 is deblocked 167 in order to increase quantization and reduce quantization error introduced by compression 154. For example, referring to FIG. 1, the effects of quantization in a single frame are often seen as blocks for encoders using fixed 8×8 DCT. This is because the blocks 110, 120 associated with a grid 100 are quantized with fixed boundaries 151-158. When a video is decoded, for example during de-blocking 167, discontinuities arise across the boundaries 151-158 for example when the motion 130 of objects 140 in video 160 interacts with these boundaries 151-158. The discontinuities are also referred to as "blocking artifacts."

According to one embodiment, a combination of estimates of subsets of the reduced information 162 is used to estimate unreduced information 152 about an object 140. Continuing the simplified example for the purpose of illustration, compressing 154 the video 150 quantizes the video data into a first subset of information including values 18, 20, 30, 42, 50 and a second subset of information including values 20, 30, 35, 46. The combination of the estimates of the subsets of information, according to one embodiment, can be used to reduce the quantization granularity. For example, the combination of the two subsets—18, 20, 30, 35, 42, 46 and 50—includes more information than either of the first subset or second subset by themselves and, therefore, is an example of decreasing the quantization errors, according to various embodiments. According to various embodiments, decreased quantization granularity reduces blocking artifacts. According to one embodiment, motion estimation is used to determine what subsets of information can be combined in order to reduce quantization error and increase quantization, as described herein.

According to one embodiment, deblocking 167 is performed in the transform domain since, for example, deblocking 167 is performed on compressed videos 160. According to one embodiment, a deblocked video 170 is referred to as an estimate since the deblocked video 170 was generated based on one or more estimates 165, according to various embodiments.

FIG. 2A is a dataflow diagram of deblocking, according to various embodiments. The blocks that represent features in FIG. 2A can be arranged differently than as illustrated, and can implement additional or fewer features than what are described herein. Further, the features represented by the blocks in FIG. 2B can be combined in various ways. The features can be implemented using hardware, hardware and software, hardware and firmware, or a combination thereof.

FIG. 2A depicts an uncompressed video 150 that is compressed 154 into a compressed video 160. The compressed video 160 is a reduced set of information 162. The reduced set of information 162 is a subset of the set of information 152 associated with the uncompressed video 150. FIG. 2A also depicts a deblocker 220 that includes a Motion Compensation Projection onto Convex Sets (MC POCS) component 230 and optionally a Spatial POCS component 224. The MC POCS component 230 includes a kernel generator 202, a constraint determiner 204, an initializer 205, and a more correct estimate generator 209.

The kernel generator 202, according to one embodiment, receives a compressed video 160 and generates one or more kernels 203. According to one embodiment, the kernel generator 202 generates the kernel 203 by performing motion estimation on the compressed video 160 to determine the locations L1-L3 of an object 140 for the purpose of determining subsets of reduced information 162, as described herein.

According to one embodiment, the kernel 203 is a DCT kernel, also referred to herein as DCT kernel $h_{DCT}$, as will become more evident. For example, according to one embodiment, the kernel generator 202 applies the DCT process defined by the encoder's specification as a part of generating the kernel 203, as will become more evident.

The constraint determiner 204, according to one embodiment, receives the compressed video 160 and the generated kernel 203. The constraint determiner 204 generates constraints 208 based on the received compressed video 160 and the kernel 203. According to one embodiment, there is a constraint 208 for each piece of DCT information derived from the compressed video 160. The constraints 208, according to one embodiment, are used to generate estimates 165b that are more correct than previous estimates 165a. According to one embodiment, constraints 208 are used in determining the possible set of hypothetical deblocked frames that may have resulted in a deblocked frame, as will become more evident.

The initializer 205, according to one embodiment, receives the compressed video 150 and generates a first estimate 165a. The more correct estimate generator 209, according to one embodiment, receives a less correct estimate 165a and the constraints 208 and generates a more correct estimate 165b based on the estimate 165a and the constraints 208. The Spatial POCS 224 receives a more correct estimate 165b and refines the estimate 165b by generating a spatially refined estimate 165c of the estimate 165b.

The deblocked video 170 is initialized with the deblocked frames provided by the deblocker 220. As will become more evident, according to one embodiment, the deblocked video 170 is generated, according to one embodiment, using one or more estimates 165a, 165b, 165c.

According to one embodiment, the deblocker 220 includes two loops 210 and 211. The outer loop 211 is for determining when all of the frames associated with a compressed video 160 have been deblocked. The outer loop 211 is exited when the condition 223 that all the frames have been processed has been met. This outer loop 211 shall be referred to as the "video frame loop." The frame that the video frame loop 211 operates on for a particular iteration is the "current frame." The inner loop 210 iteratively generates more and more correct estimates for the current frame. The inner loop 210 shall be referred to as the estimate correction loop 210. The inner loop 210 is exited when the condition 221 is met, such as the more correct estimate 165b or the spatially refined estimate 165c is not sufficiently different from the previous estimate or a specified number of iterations n have been performed.

According to one embodiment, the kernel generator 202 generates the kernel 203 by performing motion estimation on the compressed video 160. For example, during the first iteration of the loop 211 when frame a' is the "current frame" the kernel generator 202 may generate a kernel 203 by performing motion estimation on compressed frames a' and b'. During the second iteration of the 211 when frame b' is the "current frame" the kernel generator 202 may generate a kernel 203 by performing motion estimation on compressed frames a', b', and c'. During the third iteration of the 211 when frame c' is the "current frame" the kernel generator 202 may generate a kernel 203 by performing motion estimation on compressed frames b', c', and d'. For the sake of illustration, assume that frame b is the "current" frame being processed by the video frame loop 211 and the kernel 203 and constraints 208 are generated based on the compressed frames a', b', c' for the current frame b.

The constraint determiner 204, according to one embodiment, receives the compressed video 160 and the kernel 203 that is generated based on the compressed frames a', b', c', which are a part of compressed video 160. The constraint determiner 204 generates constraints 208 based on the received compressed frames a', b', c' and the kernel 203. The constraint determiner 204 generates constraints 208 based on the current compressed frame any zero or more compressed frames that are before or after the current compressed frame. For example, in the first iteration of the video frame loop 211, the constraint determiner 204 may generate constraints 208 based on compressed frame a' and zero or more of the subsequent compressed frames b'-d' associated with the compressed video 160. In the second iteration of the video frame loop 211 the constraint determiner 204 may generate constraints 208 based on the current compressed frame b' and zero or more of compressed frames a', c', d'. For the sake of illustration, assume that for the first iteration of the video frame loop 211, the constraints 208 were generated based on compressed frames a' and b'. Further for the sake of illustration, assume that for the second iteration of the video frame loop 211, that the constraints 208 were generated based on the compressed frames a', b', and c'.

Continuing the example, the initializer 205, according to one embodiment, receives the compressed video 150 and generates the estimate 165a. In the first iteration, the first estimate 165a is estimate $b'_1$ (FIG. 1). The first estimate 165a that is generated before entering the estimate correction loop 210 is not required to have low quantization error or to have high resolution. According to one embodiment, it provides a starting point for generating more correct estimates 165b for the current frame b.

The more correct estimate generator 209 receives the less correct estimate 165a and the constraints 208 and corrects the less correct estimate 165a based on the constraints 208. For example, in the first iteration of the estimate correction loop 210, the more correct estimate generator 209 receives the first estimate 165a generated by the initializer 205 and generates a more correct estimate 165b based on the received estimate 165a and the constraints 208. More specifically, referring to FIG. 1, during the first iteration of the estimate correction loop 210, estimate $b'_1$ is an example of a less correct estimate 165a and estimate $b'_2$ is an example of a more correct estimate 165b.

In the next iteration the correction loop 210, the less correct estimate 165 is initialized with the more correct estimate 165b. The more correct estimate generator 209 receives the estimate 165a and generates more correct estimate 165b based on the constraints 208. For example the second iteration, estimate $b'_2$ is an example of a less correct estimate 165a and estimate $b'_3$ is an example of a more correct estimate 165b. The estimates 165a, 165b are generated until a condition 221 is met, such as the more correct estimate $b'_n$ (FIG. 1) is not sufficiently different from the previous estimate $b'_{n-1}$ (FIG. 1) or a specified number of iterations n have been performed.

According to one embodiment, the more correct estimate generator 208 includes a third loop that is inside of the estimate correction loop 210 for applying all of the constraints 208 as a part of generating a more correct estimate 165b. This third loop shall be referred to as the "constraint application loop." The constraint application loop is exited when all of the constraints 208 have been applied, according to one embodiment. The last estimate generated by the more correct estimate generator 208 after all of the constraints 208 have been applied is used as a more correct estimate 165b.

Assuming that the MC POCS 230 does not include the optional Spatial POCS 224, if the condition 221 (FIG. 2A) is not met, the more correct estimate 165b becomes the less correct estimate 165a in the next iteration of the estimate correction loop 210, according to one embodiment. In this case, for example, the more correct estimate generator 208 receives the estimate 165a and further corrects it using the constraint application loop based on the same constraints 208 that were used in the previous iteration of the estimate correction loop 210. The same constraints 208 are used to generate a more correct estimate 165b for each iteration of the estimate correction loop 210 until the condition 221 is met, according to one embodiment.

The more correct estimate 165b generated for the last iteration of the estimate correction loop 210 is used as a deblocked frame for the deblocked video 170, according to one embodiment. For example, referring to FIG. 1 the last estimate b'n is an example of a more correct estimate 165b that met the condition 221 (FIG. 2A) and the deblocked frame b" is an example of a deblocked frame associated with the deblocked video 170. Therefore, the deblocked frame b" is initialized with the last estimate b'n, according to one embodiment.

According to one embodiment, the deblocker 220 includes a Spatial POCS component 224. A more correct estimate 165b can be refined into a spatially refined estimate 165c using Spatial POCS 224. The estimates 165a, 165b, and the refined estimates 165c are generated until the condition 221 is met. For example, during the first iteration of the estimate correction loop 210 estimate b'1 is an example of a less correct estimate 165a, estimate b'2 is an example of a more correct estimate 165b and estimate b'3 is an example of a spatially refined estimate 165c. For the second iteration of the estimate correction loop, b'3 is an example of a less correct estimate 165, b'4 is an example of a more correct estimate 165b, and b'5 is an example of a spatially refined estimate 165c and so on.

If the deblocker 222 includes Spatial POCS 224, when the condition 221 (FIG. 2A) is met, the spatially refined estimate 165c generated for the last iteration of the estimate correction loop 210 is used as a deblocked frame for the deblocked video 170. For example, referring to FIG. 1 the last estimate b'n in this case would be a spatially refined estimate 165c that met the condition 221 (FIG. 2A). The deblocked frame b" of the deblocked video 170, according to one embodiment, would be initialized with the refined estimate b'n.

A video 150 can lose resolution due to being downscaled, for example, to email the video 150, or due to being taken with a cheap camera with lens defocus. According to one embodiment, the uncompressed video 150 is a high resolution video that has not been down scaled. According to another embodiment, the uncompressed video 150 has low resolution due to downscaling. According to one embodiment, a deblocked video 170 is upscaled. According to one embodiment, the upscaled video has as high or higher resolution than the original uncompressed video 150.

Figure 2B:
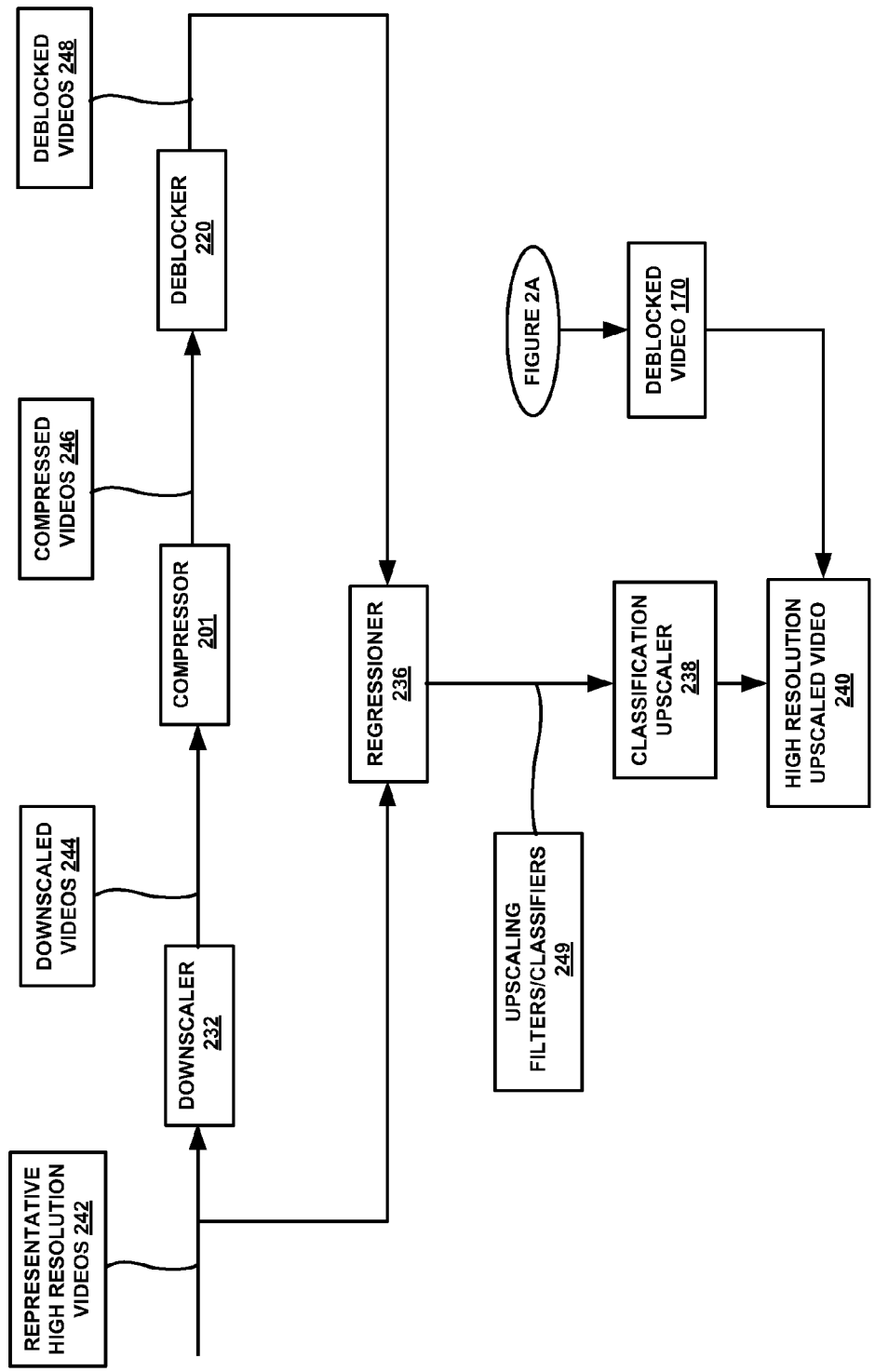
FIG. 2B is a data flow diagram of upscaling, according to various embodiments.

FIG. 2B depicts a data flow diagram of upscaling, according to various embodiments. The blocks that represent features in FIG. 2B can be arranged differently than as illustrated, and can implement additional or fewer features than what are described herein. Further, the features represented by the blocks in FIG. 2B can be combined in various ways. The features can be implemented using hardware, hardware and software, hardware and firmware, or a combination thereof.

The dataflow diagram depicted in FIG. 2B depicts components that include a downscaler 232, a compressor 201, a deblocker 220, a regressioner 236, and a classification upscaler 238. The dataflow diagram depicted in FIG. 2B also depicts various pieces of information that are received or created by the components 232, 201, 220, 236, and 238. The received or created information include the representative high resolution videos 242, the downscaled videos 244, the compressed videos 246, the deblocked videos 248, the upscaling filters/classifiers 249, the deblocked video 170, and the high resolution upscaled video 240.

According to one embodiment, the classification upscaler 238 uses a form of super resolution (SR) to upscale a deblocked video 170. Classification upscaling is also known as "resynth." Some super resolution methods can combine deblocking and upscaling but are computationally complex and rely on knowledge of the imaging process. According to one embodiment, the upscaler 238 (FIG. 2B) uses super resolution but the deblocker 220 (FIGS. 2A and 2B) does not use super resolution. Instead, according to various embodiments, the deblocker 220 uses motion estimation projection onto convex sets (MC POCS) 230, thus, providing faster deblocking 167 that is less sensitive to errors in motion estimation for an object 140 (FIG. 1) moving 130 (FIG. 1) across fixed boundaries 151-158 (FIG. 1) than conventional super resolution deblocking.

According to one embodiment, the classification upscaling function, depicted in FIG. 2B, provides for training a classification upscaler 238 with filters and classifications 249 in preparation for upscaling. During the training phase of super resolution, low resolution deblocked image patches of size 5×5 are obtained from a training set of videos 248 that were deblocked 220, according to various embodiments. These patches are mean subtracted and converted into image feature patches. According to one embodiment, the image feature patches are samples drawn from a mixture of Gaussians. According to one embodiment, soft classification is used for classifying the image feature patches. For example, the expectation maximization (EM) algorithm associated with super resolution can be used to learn the parameters, such as mean and covariance, of each Gaussian as well as the mixing of proportions. A set of filters/classifiers 249 can be designed which relate, for example, the lower resolution image patches associated with deblocked videos 248 to the corresponding high resolution pixels associated with the representative high resolution videos 242.

More specifically, a plurality of high resolution videos 242 that are representative of various features that could result in a good set of filters/classifiers 249 are downscaled by downscaler 232, compressed by compressor 201 and deblocked by deblocker 220 resulting respectively in downscaled videos 244, compressed videos 246 and deblocked videos 248. The representative high resolution videos 242 and the corresponding deblocked videos 248, according to various embodiments, are both regression processed by regressioner 236 to determine upscaling filters/classifiers 249. According to one embodiment, the output of the deblocker 220 is used to generate deblocked videos 248. According to one embodiment, the same deblocker 220 (FIGS. 2A and 2B) is used to create deblocked video 170 and deblocked videos 248 that result from the representative high resolution videos 242 for the purpose of determining the upscaling filters/classifiers 249.

According to one embodiment, at each pixel on an upscale grid 100 (FIG. 1) for a given frame, a filter is chosen based on local spatial properties (also known as "classification"), and is applied to pixels in a local neighborhood to produce the up-scaled output pixel. The training data is generated from a set of target images associated with the representative high resolution videos 242 (FIG. 2B) at the desired resolution. According to one embodiment, the desired resolution is in a range of 720p to 1080p.

The target images derived from the high resolution videos 242 are down-scaled, compressed, and deblocked, respectively by downscaler 232, compressor 201 and deblocker 220, according to various embodiments, resulting in deblocked videos 248. Regression is performed by regressioner 236 on the representative high resolution videos 242 and the corresponding deblocked videos 248 to create the upscaling filters/classifiers 249. This process is referred to as training, and results in the filters/classifiers 249. According to one embodiment, the expectation maximization algorithm associated with the classification upscaler 238 is trained by forcibly initializing the classification upscaler 238 with the filters/classifiers 249. Studies, that have given rise to various embodiments described herein, have shown that the filters/classifiers 249, which are created according to various embodiments, effectively sharpen since, for example, there may be one filter per class and the classes may take into account local edge orientations and other image features, among other things. Further, studies, which gave rise to various embodiments described herein, have shown that the forced initialization, according to one embodiment, increases the performance of super resolution. After the forced initialization, the expectation maximization algorithm implemented by the classification upscaler 238 is executed normally, according to one embodiment.

Referring to FIG. 2B, during the operational phase (as opposed to a training phase conducted with controlled inputs), the input, which will be upscaled, is an image associated with an estimate 165 (FIG. 1), which has relatively low resolution in comparison to videos 242 and 240. For example, image patches associated with the deblocked video 170 (FIG. 2A), which incorporates an estimate, such as an estimate 165a, 165b, 165c (FIG. 2A), are classified, and based on their respective classes, filtered with the respective filters/classifiers 249 (FIG. 2B) to obtain a high resolution upscaled image 240 (FIG. 2B).

Resolution Synthesis is one type of training and classification upscaling method. Although many embodiments are described in the context of super resolution, other types of training and classification methods of upscaling are well suited.

The uncompressed video 150 (FIG. 1) may or may not have high enough resolution to provide a person with a good viewing experience when displayed on a high resolution display. For example, the video 150 (FIG. 1) may have been taken using a low quality camera or may be the result of downscaling a high resolution video for the purpose of transmitting the video 150 (FIG. 1) over the internet or storing the video 150 (FIG. 1). According to one embodiment, the resolution of the upscaled video 240 (FIG. 2B) is as high as or higher than the uncompressed video 150's resolution (FIG. 1). According to one embodiment, the high resolution videos 240, 242 (FIG. 2B) have high enough resolution to provide a person with a good viewing experience while displayed on a high resolution display. According to one embodiment, the representative high resolution videos 242 (FIG. 2B) also have higher resolution than the uncompressed video 150 (FIG. 1).

The uncompressed video 150 (FIG. 1) does not have any quantization error because it is not compressed 154. The compressed video 160 (FIG. 1) has quantization error because it was compressed 154. Assuming motion estimation is flawless, quantization error for the estimates 165 (FIG. 1) is less than or equal to the quantization error for the compressed video 160 (FIG. 1), according to one embodiment. The quantization error for subsequent estimates 154 is less than or equal to the quantization error for previous estimates 154. For example, referring to FIG. 1, the quantization error for estimate b'2 is less than or equal to the quantization error for b'1, b'3, which in turn is less than or equal to the quantization error for b'2 and so on. According to one embodiment, the deblocked video 170 that is created using a deblocker 220 has less quantization error than the compressed video 160. According to one embodiment, the deblocked video 170 has much less quantization error than the corresponding decoded video that results from compressed video 160. According to one embodiment, the deblocked video 170 has no quantization error.

FIG. 3 depicts various equations that can be used as a part of generating a deblocked version of frames, according to various embodiments. Equation 5 represents logic that the more correct estimate generator 209 uses, according to one embodiment, to correct estimates 165 iteratively using the estimate correction loop 210, as depicted in FIG. 2A.

Equations 1a-5 use various symbols to represent features, according to various embodiments. For example, referring to FIGS. 1 and 2A, g represents an uncompressed video that results from decoding compressed video 160 at the deblocker 220, f represents an uncompressed video 150 or a solution for recreating the uncompressed video 150, h represents a kernel 203, and ĝ represents a motion predicted frame, d represents a residual error. Since f represents the uncompressed video 150, which the deblocker 220 does not have access to, f is a theoretical video that various embodiments are used to solve for. Therefore, f is also referred to as solution f. G, Ĝ, D, and $h_{DCT}$ respectively are the uncompressed video g, the motion predicted frame ĝ, the residual error d, and the kernel h in the DCT domain. DCT uncompressed video G and DCT motion predicted frame Ĝ are the 8×8 DCTs of image blocks g and ĝ, according to one embodiment. $f^o$ is repeatedly motion refined to $P(f^o)$ to generate an estimate 165 and C represents a constraint set 208 (FIG. 2A). Kernel h is a linear transformation, according to one embodiment. According to one embodiment, since the kernel generator 202 used motion estimation, as described herein, as a part of generating kernel 203, kernel h is spatially variant motion compensating.

Various terminologies shall be used to refer to elements depicted in the equations 1a-5 of FIG. 3. Referring to equations 1a and 1b, a particular frame in a video g or f can be designated with a value for time t and a pixel can be designed with values for time t, a column m, p and a row n, q. For the sake of simplicity, for a specific value of t, the respective terminology "uncompressed frame estimate f" and "uncompressed frame g" shall be used. For specific values of t, m, n, p, and q, the respective terminology "uncompressed pixel estimate f" and "uncompressed pixel g" shall be used. These terms may also be further refined to refer to a previous frame 191, current frame 192 or next frame 193 within a video 150, 160, 170. For example, assuming that frames b and b' (FIG. 1) respectively are the "current uncompressed frame f" and the "current compressed frame that is computed from the quantized version of D," then frames a and a' (FIG. 1) are examples respectively of the "previous uncompressed frame estimate f" and the "previous compressed frame that is computed from the quantized version of D." Further, frames c and c' (FIG. 1) are examples respectively of the "next uncompressed frame estimate f" and the "next compressed frame that is computed from the quantized version of D." Frames a, c, a', c', a", c" are adjacent to frames b, b', and b", according to one embodiment.

Referring to equation 2, for a particular value of t, the terminology "motion predicted frame ĝ" shall be used. For particular values of m, n, and t, the terminology "motion predicted pixel ĝ" shall be used. For a particular value of t, the terminology "residual error frame d" shall be used. For particular values of t, m, and n, the terminology "residual error pixel d" shall be used.

Referring to equation 3, for a particular value of t, the respective terminologies "DCT uncompressed frame G," "DCT motion predicted frame Ĝ," and "DCT residual error frame D" shall be used. For particular values of t, k, and l, the respective terminologies "DCT uncompressed pixel G," "DCT motion predicted pixel Ĝ," and "DCT residual error pixel D" shall be used.

According to one embodiment, a new form of motion estimation projection onto convex sets (MC POCS) 230 (FIG. 2A) is used as a part of removing compression artifacts during deblocking 167 (FIG. 1) that result from compressing 154 (FIG. 1) a video 150 (FIG. 1). Various embodiments pertaining to motion estimation projection onto convex sets (MC POCS) 230 provide for fast deblocking 167 (FIG. 1), which is less sensitive to an object 140 (FIG. 1) moving 130 (FIG. 1) across fixed boundaries 151-158 (FIG. 1). For the sake of illustration, assume that compressed frame b' (FIG. 1) is the current compressed frame that is being deblocked. Assume for the sake of illustration that quantization information and motion estimation of any combination of compressed frames a', b', and c' (FIG. 1) can be used to create the constraints 208 (FIG. 2A) for the current compressed frame b' that is being deblocked 167 (FIG. 2A). The constraints 208 (FIG. 2A) are used to constrain the feasible solution sets for the deblocking 167 (FIG. 2A) the current frame b (FIG. 1). According to one embodiment, there is a constraint 208 for each piece of DCT information associated with a video that is deblocked 167.

The following shall further describe equation 1a in the context of FIG. 1. For example, various symbols g, f, h, and t depicted in equation 1a will be described in the context of FIG. 1. The symbol g (equation 1a) is a frame of uncompressed video 150 (FIG. 1) at time $t_y$ and f is ideally a frame of the uncompressed video 150 (FIG. 1) at time $t_x$. f is a theoretical video frame that represents a frame a-d of uncompressed video 150 (FIG. 1) and is used in solving for a deblocked video 170 (FIG. 1) by decreasing the quantization error of the compressed video 160 (FIG. 1) using motion estimation, according to one embodiment. According to one embodiment, the linear transformation of kernel h takes into account motion between time $t_x$ and $t_y$, as well as bicubic interpolation to compute pixel values at sub-pixel locations, according to one embodiment. According to one embodiment, g is the model generated version of a frame associated with the uncompressed video 150 (FIG. 1) at time $t_x$.

The following continues to discuss the equations depicted in FIG. 3 in the context of FIG. 1. The equations 1-5 depict symbols $t_x$ and $t_y$, which represent times. Assuming that uncompressed frame b (FIG. 1) is the current frame 192 (FIG. 1) that is being used to solve for, then time t, (FIG. 3) would be time $t_b$ (FIG. 1) and time $t_y$ (FIG. 3) would be time $t_a$ or time $t_c$ (FIG. 1). The solution would be a deblocked frame b". The set of solutions b" (FIG. 1) using any combination of the compressed frames a', b', and c', for example, could be used as a part of determining an ultimate solution for the deblocked frame b" (FIG. 1).

The discussion of equation 1a (FIG. 3) in the context of FIG. 1 continues. According to one embodiment, the spatially variant motion compensating kernel h, which relates the pixels in the current uncompressed frame f (depicted as frame b in FIG. 1) and the next uncompressed frame g (depicted as frame c in FIG. 1) is also referred to herein as "kernel h". For example, kernel h, according to one embodiment, is determined by performing motion estimation on the compressed video frames b' and c'.

As described herein, the summation 301 depicted in equation 1a takes into account motion, and takes into account that there might be a bicubic interpolation involved if the motion estimation has sub pixel accuracy. According to one embodiment, for a global affine motion model, it is possible to pre-compute a look-up table, which can be indexed to compute the blur at different image locations L1, L2, L3 (FIG. 1). A pre-computed look up table makes computations fast while deblocking 167 (FIG. 2A), according to one embodiment.

Equation 1b depicts that a symbol X" can represent the uncompressed video f. For example, the X" depicted in equation 1b on FIG. 3, can represent which ever uncompressed frame a, b, c, or d (FIG. 1) that is being solved for. Assuming that uncompressed frame b (FIG. 1) is used for X (equation 1b on FIG. 3), equation 1b can be used to solve for a corresponding deblocked frame b" (FIG. 1) by initializing X" (equation 1b on FIG. 3) to f (equation 1a on FIG. 3). f in this case can represent an estimate $b'_n$, as depicted in FIG. 1. In the last iteration of the correction loop 210, the estimate $b'_n$ is a solution f and is used as the deblocked frame b" (FIG. 1), according to one embodiment.

Equation 1c, depicted in FIG. 3, is a Discrete Cosine Transform Domain (DCT) version of equation 1a, according to one embodiment. For example, equation 1a indicates that the compressed video g results from applying the kernel h to the uncompressed video f. Equation 1a can be rewritten as equation 1c, which indicates that the DCT compressed video G results from applying the DCT kernel $h_{DCT}$ to the uncompressed video f, for the Discrete Cosine Transform Domain (DCT). According to one embodiment, the DCT compressed video G is an 8×8 DCT of image block g.

Equation 2 indicates that the residual error d, according to one embodiment, is the difference between the uncompressed frame g and the motion predicted frame ĝ, which is computed using the motion vectors, which were generated by the encoder, associated with the uncompressed video G and the encoder's specification, such as, the specification for the MPEG or H.26X codec. According to one embodiment, the motion predicted frame g is zero so that d is equivalent to g for frames having no motion compensation (also known as "I" frames) or for a codec like MJPEG.

Equation 3 is the Discrete Cosine Transform Domain (DCT) of equation 2, according to one embodiment. For example, the DCT compressed video G and DCT motion predicted frame Ĝ are the 8×8 DCTs of image blocks g and g, according to one embodiment. The DCT residual error D, according to one embodiment, is the difference between the DCT uncompressed frame G and the DCT motion predicted frame Ĝ. The motion predicted frame Ĝ can be computed at the decoder using previously decoded frames for a', b', c' from compressed video 160 and the motion vectors, which were generated by the encoder, associated with the uncompressed video G and the encoder's specification. According to another embodiment, the quantized version of the DCT residual error D can be obtained from either the encoder or the decoder. As will become more evident, the relationships between the DCT residual error D, the uncompressed frame G and the motion compensated frame Ĝ as expressed by the equations $G=b_l+\hat{G}$ and $G=b_u+\hat{G}$ that define the constraints 208, according to one embodiment, are used in equation 5 to create more correct estimates until the solution f has satisfied the condition 221 (FIG. 2A) for exiting the estimate correction loop 210 (FIG. 2A).

Equation 4, according to one embodiment, is derived using equations 1c and 3. For example, as depicted in equation 1c, the DCT uncompressed video G equals $\Sigma f \cdot h_{DCT}$. Equation 4 can be derived by substituting the G in equation 3 with the $\Sigma f \cdot h_{DCT}$ from equation 1c. In equation 4, $h_{DCT}$ is a kernel h in the DCT domain, according to one embodiment. According to one embodiment, the DCT kernel $h_{DCT}$ is the kernel 203 depicted in FIG. 2A. According to one embodiment, the DCT kernel $h_{DCT}$ is spatially variant motion compensating because, according to one embodiment, the kernel generator 202 used motion estimation as a part of generating the DCT kernel $h_{DCT}$. By letting the DCT kernel $h_{DCT}$ (equation 4) take into account the DCT acting on the kernel h (equation 1a), the DCT kernel $h_{DCT}$ also incorporates the motion estimation included by the kernel h, thus, equation 3 becomes equation 4. Further, according to one embodiment, the DCT kernel $h_{DCT}$ is a linear transformation.

The following shall describe equation 4 (FIG. 3) in the context of FIG. 1. Continuing the example of b' (FIG. 1) being the current compressed frame that is being deblocked 167 (FIG. 1), equation 4 (FIG. 3) relates the DCT coefficients of the adjacent (191 and 193 in FIG. 1) frames a, a', c, c', d, d' with the current deblocked frame b'' (FIG. 1). In this case, according to one embodiment, the current uncompressed frame b (FIG. 1) can be estimated in order to generate a deblocked frame b'' (FIG. 1), as will become more evident.

According to one embodiment, equation 5 symbolically expresses logic used repeatedly to transform a current less correct estimate 165a (FIG. 2A) into a current more correct estimate 165b (FIG. 2A). For example, at every $(k,l,t_y)$ from frames a', b', c' being used to create the current more correct estimate, the current estimate, $f^o$, depicted to the right of the equal sign of equation 5, is refined into $P(f^o)$, to the left of the equal sign of equation 5. For example, equation 5 is repeatedly applied using constraints 208 (FIG. 2A) and compressed videos, the first value of $f^o$ being the current less correct estimate, and the last $P(f^o)$ resulting after application of equation 5 repeatedly for all constraints at $(k,l,t_y)$ is used as the current more correct estimate.

The following shall describe equation 5, according to one embodiment, in the context of FIGS. 1 and 2A. According to one embodiment, the question in correcting an estimate 165 (FIG. 2A) is what possible set of hypothetical deblocked frames, for instance when determining deblocked frame b'' (FIG. 1), could possibly give rise to the related compressed frames, such as a', b', c' (FIG. 1). A deblocked that belongs to this set will be referred to as "consistent". According to one embodiment, any one or more of the compressed frames a', b', c' (FIG. 1) are used in determining the possible set of hypothetical deblocked frames using for example the relationships expressed by equation 4 (FIG. 3), which are incorporated into equation 5 (FIG. 3), according to one embodiment. According to one embodiment, equation 5 is used to determine a consistent deblocked frame to be used as the deblocked frame b'' (FIG. 1) associated with the deblocked video 170 (FIG. 1), according to one embodiment. According to one embodiment, constraints 208 (FIG. 2A) are used as a part of determining the possible set of deblocked frames that may have resulted in deblocked frame b'' (FIG. 1).

Equation 5 uses constraints 208 as a part of determining the possible set of deblocked frames that may be consistent and therefore have resulted in a deblocked frame. There are many constraints embodied by constraints 208. For example, there may be one constraint for every $(k,l,t_y)$ in equations 3 and 4. The determination of the possible set of deblocked frames, according to one embodiment, includes repeatedly refining estimates $f^o$ using equation 5, to generate a consistent deblocked frame satisfying constraints 208, which is an estimate of the current uncompressed frame b, according to one embodiment.

Figure 4:
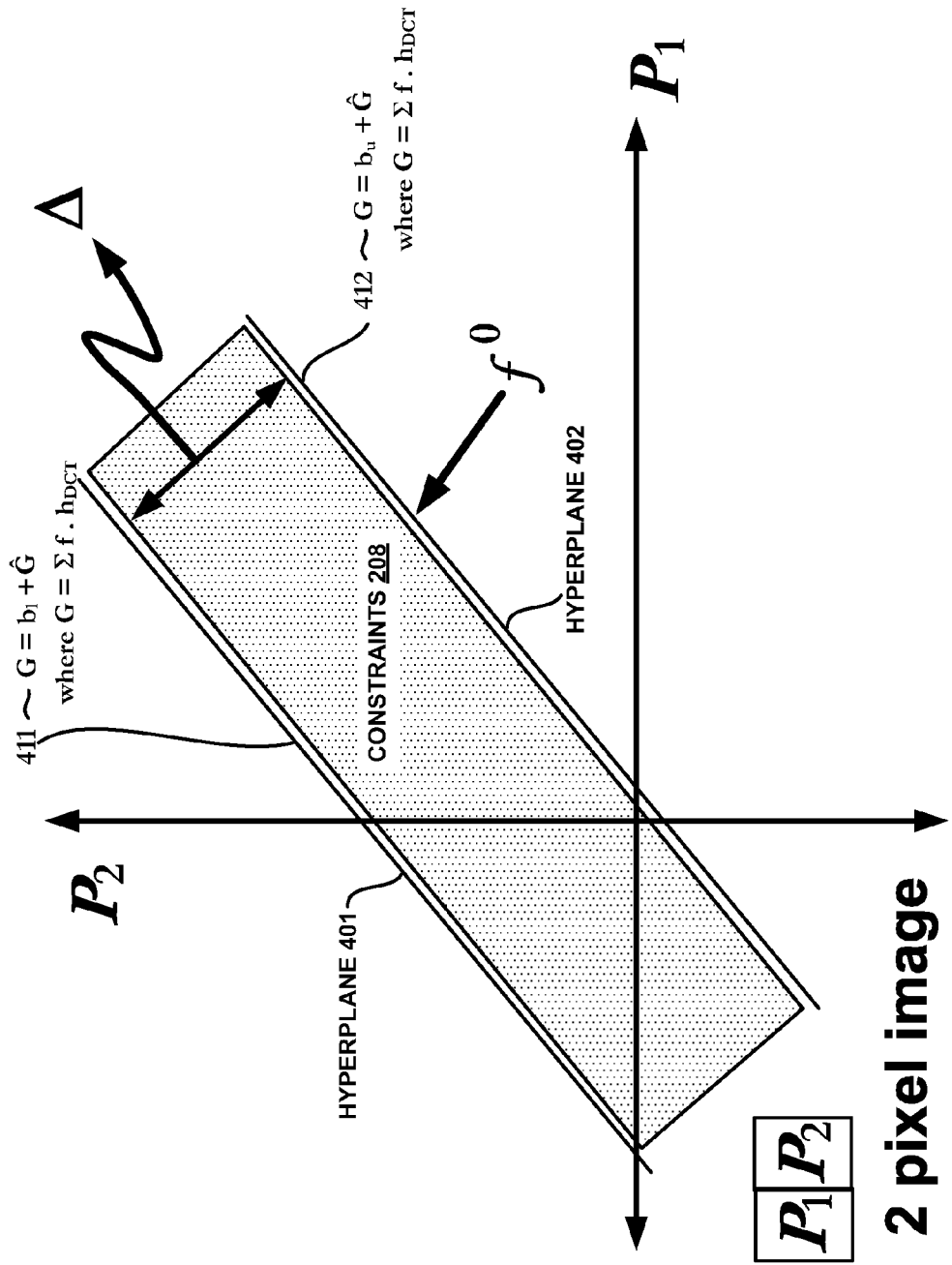
FIG. 4 depicts constraints that are used for correcting a current estimate of an uncompressed frame, according to one embodiment.

FIG. 4 depicts one of the constraints 208 that are used for refining a current estimate $f^o$ of an uncompressed frame f, according to one embodiment. FIG. 4 depicts a two pixel image with pixels p1 and p2, two hyper planes 401 and 402, the difference between the two hyper planes 401 and 402 represented by delta $\Delta$, constraints 208, and an estimate $f^o$ of an uncompressed frame. The two hyper planes 401 and 402 can be determined using equations 411 and 412, which respectively are $G = b_l + \hat{G}$ and $G = b_u + \hat{G}$. According to one embodiment, the G in the equations 411 and 412 is equal to $\Sigma f \cdot h_{DCT}$ as depicted in equation 1c, which is also the summation term 302 in equation 4. The constraints 208 are represented by the shaded area between the hyper planes 401 and 402 depicted in FIG. 4.

Although, the actual values of the DCT coefficients associated with the DCT residual error D are not known, the interval represented by delta $\Delta$ (FIG. 4) that the coefficients lie in can be determined based on quantization bounds $b_l$ and $b_u$. Therefore, according to one embodiment, the quantization bounds $b_l$ and $b_u$ can be determined based on the quantized DCT residual error D and knowledge of the video encoding standard. The quantization bounds $b_l$ and $b_u$ in combination with the motion predicted $\hat{G}$ can be used in the equations $G = b_l + \hat{G}$ and $G = b_u + \hat{G}$ (411 and 412 in FIG. 4) that represent the hyper planes 401, 402 (FIG. 4) that define constraints 208 (FIG. 2A).

According to one embodiment, equation 5 symbolically expresses logic for transforming a current estimate used as the initial $f^o$, depicted to the right of the equal sign of equation 5, into a motion refined estimate $P(f^o)$, to the left of the equal sign of equation 5. According to one embodiment, the more correct estimate generator 209 includes a loop that repeatedly applies equation 5 to all the constraints in constraints 208, which may include one constraint for each $(k,l,t_y)$, in order to finally produce a more correct estimate 165b. For example, in the first iteration, the initial $f^o$ is initialized to the less correct estimate 165a. Each iteration of the more correct estimate generator 209's loop results in a motion refined estimate, according to one embodiment. The final motion refined estimate $P(f^o)$ created by the more correct estimate generator 209's loop is used as the more correct estimate 165b. For example, the sub equations 304, according to one embodiment, are used to determine whether to further refine the estimate $f^o$. The sub equations 304 include $b_l + \hat{G}$ and $b_u + \hat{G}$, which are the equations 411 and 412 that define the hyper planes 401 and 402 of one of the constraints 208 in FIG. 4, according to one embodiment. The sub equations 303 are used, according to one embodiment, to determine how to generate a motion refined estimate $P(f^o)$. The sub equations 303 include $f^o \cdot h_{DCT}$, according to one embodiment. Uncompressed video G is equal to the uncompressed video estimate f acted on by the DCT kernel hDCT ($G = f \cdot h_{DCT}$) as depicted in equation 1c. $f^o$ is an estimate of the uncompressed video f. The sub equation $f^o \cdot h_{DCT}$ can be used to generate a compressed video of the current estimate $f^o$. G can also be expressed as $b_l + \hat{G}$ as $b_u + \hat{G}$ as depicted in FIG. 4. Therefore, according to one embodiment, equation 5 determines whether a compressed video of the estimate $f^o$, on the right side of equation 5, is within the boundaries of the constraints defined by $b_l + \hat{G}$, $b_u + \hat{G}$ by calculating $b_l + \hat{G} < f^o \cdot h_{DCT} > b_u + \hat{G}$. If the uncompressed video of the less correct estimate $f^o$ is not within the boundaries, a motion refined estimate $f^o$ is generated, for example, by moving the current estimate $f^o$ to whichever of the two hyper planes 401, 402 is closest to the current estimate $f^0$ using the sub equations depicted at 303, according to one embodiment.

Referring to FIG. 4, if the current estimate $f^0$ depicted in equation 5 (FIG. 3) is a point shown in FIG. 4, then the projection can be accomplished by adding the current estimate $f^0$ to a scaled version of the DCT kernel $h_{DCT}$, as depicted by sub equation 303 in FIG. 3, such that the result is a point on whichever of the hyper planes 401 and 402 (FIG. 4) defined by the constraint 208 (FIG. 4) is closest to the current estimate $f^0$. The result from adding the current estimate $f^0$ to the scaled version of DCT kernel $h_{DCT}$ is an example of step used to create a more correct estimate (165*b* in FIG. 2A) of f. The projection P that takes the current estimate $f^0$ and projects it onto the constraint set 208 can be written as depicted in equation 5.

After all of the constraints 208 have been applied by the more correct estimate generator 209, the more correct estimate 165*b* is initialized with the final estimate $P(f^0)$ from equation 5, according to one embodiment. If the more correct estimate 165*b* does not meet the condition 221, then the current more correct estimate 165*b* can be further corrected in another iteration of the estimate correction loop 210, as described herein, by applying the same constraints 208 again using equation 5 in the more correct estimate generator 209, as described herein. The constraints 208 are repeatedly applied, according to one embodiment, using the estimate correction loop 210 until a final estimate $P(f^0)$ of equation 5 meets the condition 221 for exiting the estimate correction loop 210, as described herein. This final estimate $P(f^0)$ is used as part of the deblocked video 170, according to one embodiment.

According to one embodiment, motion estimation projection onto convex sets (MC POCS) 230 (FIG. 2A) using equation 5 (FIG. 3) provides detailed features and edges as a part of deblocking 167 (FIG. 2A). According to one embodiment, Spatial Projection onto Convex Sets (Spatial POCS) 224 (FIG. 2A) is used in addition to the motion estimation projection onto convex sets (MC POCS) 230 (FIG. 2A) to refine the more correct estimate 165*b* (FIG. 2A) resulting in a spatially refined estimate 165*c* (FIG. 2A). MC POCS 230 as provided by equation 5 performs well along edges and detailed regions, according to one embodiment. Spatial POCS 224 performs well in flat regions, however, does not restore detail, according to one embodiment. Therefore, the combination of MC POCS 230 and Spatial POCS 224 provide excellent results, according to one embodiment, since the restoration of detail by the MC POCS constraints 208 is complemented by the smoothing in flat regions from Spatial POCS 224. For example, the combination of MC POCS 230 and Spatial POCS 224 may be sharper than the results from Spatial POCS 224 alone due to the integration of information from multiple frames. Referring to FIG. 1, two or more compressed frames a', b', and c' are examples of multiple frames that information can be integrated from, according to various embodiments, in order to provide sharper results when solving for deblocked frame b".

According to one embodiment, spatial POCS leverages DCT-domain analysis to determine where horizontal and vertical boundaries are located due to blocking artifacts. DCT content that is inherent within the source video can be categorized using the DCT size in each dimension (i.e., vertical and horizontal) used during coding. DCT content that was caused by blocking artifacts can be inferred with a twice size DCT. Thus, convex constraint set can be determined and used to create a non-blocky video that is consistent with the original, uncompressed source.

Figure 5:
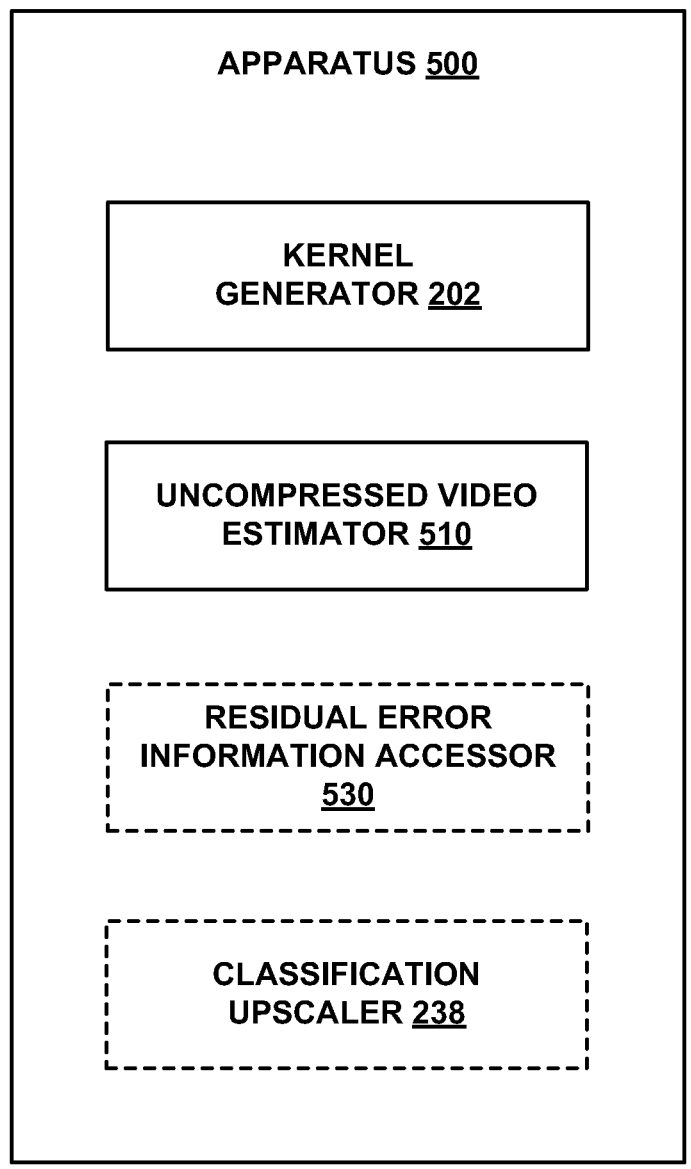
FIG. 5 depicts a block diagram of an apparatus for generating a deblocked version of video frames using motion estimation, according to one embodiment.

FIG. 5 depicts a block diagram of an apparatus 500 for generating a deblocked version of video frames using motion estimation, according to one embodiment. The blocks that represent features in FIG. 5 can be arranged differently than as illustrated, and can implement additional or fewer features than what are described herein. Further, the features represented by the blocks in FIG. 5 can be combined in various ways. The apparatus 500 can be implemented using hardware, hardware and software, hardware and firmware, or a combination thereof.

According to one embodiment, the apparatus 500 resides at a decoder or is communicatively coupled to a decoder. The apparatus 500 includes a transform domain kernel generator 202 (also referred to herein as a "kernel generator") and uncompressed video estimator 510. The kernel generator 202 (FIG. 5) is configured for computing a transform domain kernel 203 (FIG. 2A), which relates information associated with a frame estimate b'1-b'n (FIG. 1) of an uncompressed frame b of a video 150 (FIG. 1) with information associated with an adjacent compressed frame a', c' (FIG. 1) in the transform domain. The frame estimate b'1-b'n is a current frame. The frame estimate b'1-b'n and the adjacent compressed frame a', c' (FIG. 1) are consecutive frames of the video. The uncompressed video estimator 510 (FIG. 5) is configured for reducing quantization error by creating a video estimate b'1-b'n (FIG. 1) of an uncompressed version 150 (FIG. 1) of the video based on the compressed version 160 (FIG. 1) of the video and the computed transform domain kernel 203 (FIG. 2A). According to one embodiment, the transform domain is a Discrete Cosine Transform (DCT) domain and the transform domain kernel 203 is a DCT kernel.

According to one embodiment, the apparatus 500 also includes a residual error information accessor 530 that is configured for accessing residual error related to compressing 154 (FIG. 1) the uncompressed version 150 (FIG. 1) of the video into the compressed version 160 (FIG. 1) of the video. For example, the residual error information accessor 530 may access motion vectors associated with the compressed video 160 (FIG. 1) that are used to generate a residual error d (FIG. 3). In another example, the residual error information accessor 530 may access a residual error d associated with a compressed version 160 (FIG. 1) of the video. The residual error d or the motion vectors may be provided by the encoder or the decoder, among other things.

According to one embodiment, the apparatus 500 also includes a classification upscaler 238 that is configured for upscaling a deblocked video 170 (FIG. 1). According to one embodiment, the deblocked video 170 is an estimate 165 (FIG. 1) of the uncompressed version 150 (FIG. 1) of the video. According to one embodiment, the classification upscaler 238 is configured for receiving, for example at the regressioner 236 (FIG. 2B), second more correct estimates, for example in the form of a second deblocked video 248 (FIG. 2B) and training the classification upscaler 238 based on the second more correct estimates. The second video 248 is generated based on the transform domain kernel, according to one embodiment. According to one embodiment, the classification upscaler 238 upscales the deblocked video 170 after it has been trained.

According to one embodiment, the apparatus 500 (FIG. 5) also includes a computer readable storage medium with computer executable instructions stored on the computer readable storage medium. The computer executable instructions implement the kernel generator 202 (FIG. 5) and the estimator 510 (FIG. 5). According to one embodiment, the computer executable instructions may implement one or more of the classification upscaler 238 (FIG. 5) and the residual error information accessor 530 (FIG. 5).

Figure 6:
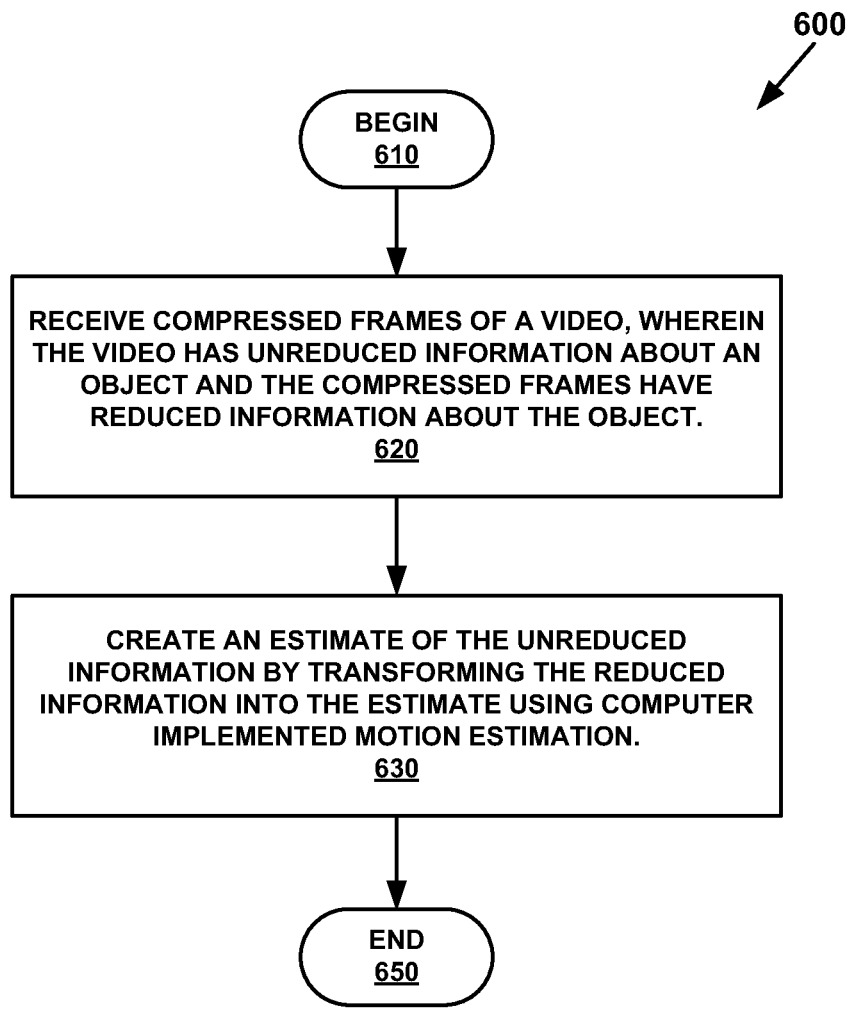
FIG. 6 is a flowchart of a method for generating a deblocked version of video frames using motion estimation, according to one embodiment.

FIG. 6 depicts a flowchart of a method for generating a deblocked version of video frames using motion estimation, according to various embodiments. Although specific operations are disclosed in flowchart 600, such operations are exemplary. That is, embodiments of the present invention are well suited to performing various other operations or variations of the operations recited in flowchart 600. It is appreciated that the operations in flowchart 600 may be performed in an order different than presented, and that not all of the operations in flowchart 600 may be performed.

At 610, the method begins.

At 620, referring to FIG. 1, compressed frames 160 of a video 150 are received. Reduced information 162 about an object 140 is associated with the compressed frames 160. Unreduced information about the object 140 is associated with the video 150. The reduced set of information 162 is a result of compressing 154 uncompressed frames 150 and the object 140 moving 130 in time 190 with respect to boundaries 151-158 that are fixed with in each of the compressed frames a', b', c', d', according to one embodiment. For example, an uncompressed video 150 is a set of information 152 about various objects 140 associated with it. This set of information 152 is referred to herein as an unreduced set of information 152. When the video 150 is compressed 154, information is removed from the unreduced set of information 152 resulting in a reduced set of information 162. The uncompressed video 150 is also referred to herein as the uncompressed video g, and possibly f, which is depicted in various equations on FIG. 3. The compressed video 160 is represented by a quantized version of D, which is depicted in various equations on FIG. 3. The compressed video 160 is deblocked 167, for example, in the DCT domain, according to various embodiments. The compressed frames 160 with the reduced information 162 can be received, for example, by an apparatus 500 (FIG. 5). The apparatus 500 may reside at a decoder or be communicatively coupled to a decoder.

At 630, referring to FIG. 1, an estimate 165 of the unreduced information 152 is created by transforming the reduced information 162 into the estimate 165 using computer implemented motion estimation. The estimate 162 has less quantization error than the reduced information 162. For example, the reduced set of information 162 is a result of compressing 154 the frames 150 and the object 140 moving 130 with respect to boundaries 151-158 that are fixed with in each of the compressed frames a'-d' associated with the compressed video 160. Different subsets of the unreduced set of information 152 are discarded depending on where the object 140 is located with respect to the fixed boundaries 151-158. In a simplified example for the purpose of illustration, assume that the unreduced set of information 152 about the object 140 for the uncompressed frames 150 includes values 1-256. When the frames 150 are compressed, the reduced set of information 162 may include a first subset of information with values 18, 20, 30, 42, 50 and a second subset of information with values 20, 30, 35, 46. A combination of the two subsets—18, 20, 30, 35, 42, 46, 50—would result in more values than either of the subsets by themselves.

The two subsets of information associated with the reduced set of information 162 can be estimated, according to one embodiment. For example, according to one embodiment, motion estimation is used to analyze the locations L1-L3 of the object 140 in the compressed frames 160 to determine that the two subsets of information are related to each other. The combination of the estimates of the subsets provides additional information to deduce the unreduced set of information 152 about the object 140. The combination of the estimates can be used to transform the compressed video 160 into an estimate 165 of the uncompressed video 150. Estimates 165a, 165b and 165c (FIG. 2A) are examples of estimates 165 (FIG. 1)

The kernel determiner 202 (FIG. 5) can use motion estimation to compute a kernel 203 (FIG. 2A), such as the DCT kernel $h_{DCT}$. The DCT kernel $h_{DCT}$ 203 relates information associated with a current uncompressed frame b (FIG. 1) to information associated with an adjacent compressed frame a' or c' (FIG. 1) in the DCT domain. The kernel determiner 202 uses motion estimation, where the current frame b and the adjacent frame a' or c' are consecutive frames of a video 150, 160 (FIG. 1), to generate the DCT kernel $h_{DCT}$. Thus the DCT kernel $h_{DCT}$ incorporates motion estimation information, according to one embodiment.

Referring to equation 3 (FIG. 3), the DCT residual error D, according to one embodiment, is the difference between the DCT uncompressed frame G and the DCT motion predicted frame $\hat{G}$. According to another embodiment, the DCT residual error D can be obtained from either the encoder or the decoder. The DCT residual error D, according to one embodiment, is in quantized form.

Referring to FIG. 2A, the constraint determiner 204 can receive the compressed video 160, the DCT kernel hDCT, and the DCT residual error D. The constraint determiner 204 can determine the upper and lower quantization boundaries $b_u$ and bl for equation 3 (FIG. 3), as described herein, that bound the DCT residual error D. The constraint determiner 204 (FIG. 2A) can determine the equations $G=b_l+\hat{g}$ and $G=b_u+\hat{G}$ (depicted as 411, 412 in FIG. 4) that define the hyper planes 401 and 402 (FIG. 4) for the constraints 208 (FIGS. 2A and 4).

Referring to FIG. 2A, the uncompressed video estimator 510 (FIG. 5) can use the DCT kernel $h_{DCT}$ 203 the DCT motion compensated frame 6, and the constraints 208 to transform the DCT compressed video 160 into a deblocked video 170 by iteratively correcting estimates 165a, 165b of the uncompressed video 150. According to one embodiment, the uncompressed video estimator 510 (FIG. 5) uses logic that can be represented by equation 5 (FIG. 3) as a part of generating the deblocked video 170.

Equation 5 (FIG. 3) refers to estimates $f^o$ (165 in FIGS. 1 and 2A), the DCT motion predicted frame $\hat{G}$, constraint boundaries $b_u$ and $b_l$ (FIG. 4), the DCT kernel $h_{DCT}$ (203 in FIG. 2A), among other things. The compressed video 160 (FIG. 2A) is an example of a DCT compressed video which includes a quantized version of D, according to one embodiment. The motion predicted frame $\hat{G}$ can be computed using the motion vectors, which were generated by the encoder, associated with the uncompressed video G and the encoder's specification. The sub equations $b_l+\hat{G}$ and $b_u+\hat{G}$ depicted in equation 5 (FIG. 3) refer respectively to the equations $G=b_l+\hat{G}$ and $G=b_u+\hat{G}$ (depicted as 411, 412 in FIG. 4). The equations 411 and 412 (FIG. 4) represent the hyper planes 401, 402 (FIG. 4) that define the constraints 208 (FIGS. 2A and 4). According to one embodiment, the estimate $f^o$ to the right side of equation 3 (FIG. 3) can be a less correct estimate 165a (FIG. 2A), when processing the first of the constraints in constraints 208, and the motion refinement $P(f^o)$, on the left side of equation 5, after applying equation 5 for all the constraints in constraints 208, is a more correct estimate 165b (FIG. 2A). Therefore, according to one embodiment, the uncompressed video estimator 510 (FIG. 5) can iteratively generate more correct estimates as depicted as 165b FIG. 2A, of a compressed video 160 using equation 5 (FIG. 3) for example, based on less correct estimates (also depicted as 165a on FIG. 2A), the DCT kernel $h_{DCT}$ (203 in FIG. 2A), and the constraints 208, among other things, as described herein.

At 640, the method ends.

As stated herein, an estimate 165 (FIG. 2A) may be a less correct estimate 165a (FIG. 2A), a more correct estimate 165b (FIG. 2A), or a spatially refined estimate 165c (FIG. 2A). An estimate 165 can be refined using Spatial POCS 224 (FIG. 2A) resulting in a spatially refined estimate 165c (FIG. 2A), as described herein. A deblocked video 170 (FIG. 2A) can be upscaled using a classification upscaler 238 (FIGS. 2B and 5). Referring to FIG. 2B, a classification upscaler 238, according to one embodiment, is trained using deblocked videos 248, which were generated using a DCT kernel hDCT created by the kernel generator 202 (FIG. 2A). The training results in upscaling filters/classifiers 249. The deblocked videos 248 (FIG. 2B) may or may not have been refined using Spatial POCS 224 (FIG. 2A) before being used to generate the filters/classifiers 249 (FIG. 2B). After the classification upscaler 238 (FIG. 2B) has been trained, the classification upscaler 238 can upscale the deblocked video 170 (FIGS. 1 and 2A), according to one embodiment, as described herein.

Although various embodiments were described in the context of a previous frame 191, a current frame 192 and a next frame 193, various embodiments are well suited for deblocking 167 a frame using the frame itself or any one or more frames that are before or after a frame. For example, referring to FIG. 1, any one or more of compressed frames a', b', or c', d', among other things, can be used as a part of generating deblocked frame b''.

Referring to FIG. 1, although various embodiments are described in the context of an object 140 moving 130, various embodiments are well suited to using motion estimation when an object that is fixed in space appears to move relative to fixed boundaries due to the camera moving slightly. Although various embodiments are described in the context of four frames a, b, c, d, various embodiments are well suited to two frames. The term "video" shall be used to refer to any two or more frames (also referred to as "pictures" or "images") of an object where the object is located in different locations in the frames due to the object moving or the camera moving. Although various embodiments are described in the context of one object, various embodiments are well suited to frames that depict multiple objects.

Any one or more of the embodiments described herein can be implemented using computer readable storage medium and computer-executable instructions which reside, for example, in computer-readable storage medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within computer readable storage memory of a computer system and are executed by the processor of the computer system. When executed, the instructions cause the computer system to implement the functionality of various embodiments of the present invention.

Various embodiments provide for transforming data from one form into another form that cause the state of a computer system to be changed. For example, a compressed video 160 can be transformed into a deblocked video 170. The deblocked video 170 can be played on a computer system. The playing of the deblocked video 170 transforms the state of the computer system.

Various embodiments have been described in various combinations. However, any two or more embodiments may be combined. Further, any embodiment may be used separately from any other embodiments.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A method of generating a deblocked version of video frames using motion estimation, the method comprising:
receiving compressed frames of a video, wherein the video has unreduced information about an object moving with respect to boundaries that are fixed with in each frame of the video and the compressed frames have reduced information about the object moving with respect to the boundaries that are fixed with in each of the compressed frames, wherein the reduced information has quantization error due to compression; and
creating an estimate, which has less quantization error than the reduced information, of the unreduced information by transforming the reduced information into the estimate using computer implemented motion estimation.

2. The method as recited in claim 1, wherein the estimate is a less correct estimate and the method further comprises:
forming a convex set based on constraints from a transform domain residual error; and
transforming the less correct estimate into a more correct estimate, that has less quantization error than the less correct estimate, of the unreduced information by projecting the less correct estimate onto the convex set using motion compensation projection onto convex set.

3. The method as recited by claim 2, wherein the method further comprises:
transforming the more correct estimate into a spatially refined estimate, which has higher resolution than the more correct estimate, using spatial projection onto convex set.

4. The method as recited by claim 1, further comprising:
receiving deblocked videos that were deblocked using the computer implemented motion estimation in the transform domain;
receiving representative high resolution videos; and
determining filters and classifications by regression processing the deblocked videos and the representative high resolution videos.

5. The method as recited by claim 4, further comprising:
upscaling an estimate using a classification system that has been trained with the filters and classifications.

6. The method as recited by claim 5, wherein the method further comprises:
upscaling the spatially refined estimate using the fillers and classifications that result from the training of the classification system.

7. An apparatus for generating a deblocked version of video using motion estimation, the apparatus comprising:
a non-transitory computer readable storage medium with computer executable instructions stored on the computer readable storage medium, wherein the computer executable instructions implement:

a transform domain kernel generator configured for computing a transform domain kernel, which relates information associated with a frame estimate of an uncompressed frame of a video with information associated with an adjacent compressed frame in the transform domain, wherein the frame estimate is a current frame and wherein the current frame and the adjacent compressed frame are consecutive frames of the video;

an uncompressed video estimator configured for reducing quantization error by creating a video estimate of an uncompressed version of the video based on the compressed version of the video and the computed transform domain kernel.

8. The apparatus of claim 7, wherein the transform domain is a Discrete Cosine Transform (DCT) domain and the transform domain kernel is a DCT kernel.

9. The apparatus of claim 7, wherein the apparatus further comprises:

a residual error information accessor configured for accessing residual error related to compressing the uncompressed version of the video into the compressed version of the video.

10. The apparatus of claim 7, wherein the estimate is a less correct estimate and the uncompressed video estimator is further configured for:

transforming the compressed version into a less correct estimate of the uncompressed version of the video.

11. The apparatus of claim 10, wherein the uncompressed video estimator is further configured for:

transforming the less correct estimate into a more correct estimate, which has less quantization error than the less correct estimate, of the uncompressed version of the video.

12. The apparatus of claim 7, wherein the apparatus further comprises a classification upscaler that is configured for:

receiving second more correct estimates of a second video, which the uncompressed video estimator generated based on the transform domain kernel; and being trained based on the second more correct estimates.

13. The apparatus of claim 12, wherein the classification upscaler is further configured for upscaling the estimate of the uncompressed version of the video after the classification upscaler has been trained.

14. A non-transitory computer readable storage medium having computer-readable program instructions stored thereon for causing a computer system to perform a method of generating a deblocked version of video using motion estimation, the method comprising:

receiving a compressed version of a video with reduced information about an object that moves with respect to boundaries that are fixed with in each frame of the compressed version;

creating an estimate of unreduced information, which has less quantization error than the compressed version, of an uncompressed version of the video by transforming the reduced information about the object, using computer implemented motion estimation in a transform domain, into the estimate of the unreduced information about the object; and upscaling the estimate using a classification system that was trained based, at least in part, on representative high resolution videos and a second estimate of second uncompressed versions of the representative high resolution videos.

* * * * *

UNITED STATES PATENT AND TRADEMARK OFFICE
CERTIFICATE OF CORRECTION

PATENT NO. : 8,582,654 B1  
APPLICATION NO. : 12/570354  
DATED : November 12, 2013  
INVENTOR(S) : Andrew J. Patti et al.

Page 1 of 1

It is certified that error appears in the above-identified patent and that said Letters Patent is hereby corrected as shown below:

In the Claims:

In column 22, line 59, in Claim 6, delete "fillers" and insert -- filters --, therefor.

Signed and Sealed this
Twenty-fifth Day of March, 2014

Michelle K. Lee
*Deputy Director of the United States Patent and Trademark Office*